United States Patent
Lee et al.

(10) Patent No.: US 7,927,733 B2
(45) Date of Patent: Apr. 19, 2011

(54) CASE FOR BATTERIES AND PREPARATION METHOD THEREOF

(75) Inventors: Seo Jae Lee, Yuseong-gu Daejeon (KR); Ki Young Lee, Yuseong-gu Daejeon (KR); Ho Kyung Byun, Miryang-si (KR); Yong Bum Park, Goyang-si (KR); Chang Sung Ha, Suncheon-si (KR); Byung Gi Jeon, Seongnam-si (KR); Young Tack An, Daejon (KR); Sung Min Hwang, Seoul (KR); Joon Sung Bae, Yuseong-gu Daejeon (KR)

(73) Assignees: LG Chem, Ltd. (KR); Future Metal Corporation (KR)

( * ) Notice: Subject to any disclaimer, the term of this patent is extended or adjusted under 35 U.S.C. 154(b) by 936 days.

(21) Appl. No.: 11/813,299

(22) PCT Filed: Jan. 6, 2006

(86) PCT No.: PCT/KR2006/000053
§ 371 (c)(1),
(2), (4) Date: Jul. 3, 2007

(87) PCT Pub. No.: WO2006/073277
PCT Pub. Date: Jul. 13, 2006

(65) Prior Publication Data
US 2008/0107963 A1    May 8, 2008

(30) Foreign Application Priority Data

Jan. 7, 2005  (KR) .................. 10-2005-0001652
Jan. 25, 2005 (KR) .................. 10-2005-0006529

(51) Int. Cl.
*H01M 2/02* (2006.01)
*B32B 37/00* (2006.01)
*C25D 3/12* (2006.01)

(52) U.S. Cl. .......... 429/163; 429/164; 429/174; 156/60; 205/152; 205/271; 427/58

(58) Field of Classification Search ................. None
See application file for complete search history.

(56) References Cited

U.S. PATENT DOCUMENTS 6,136,107 A * 10/2000 Ohmura et al. ............ 148/537

(Continued)

FOREIGN PATENT DOCUMENTS

| JP | 06346282 | 12/1994 |
| JP | 09306438 | 11/1997 |

(Continued)

OTHER PUBLICATIONS

PCT International Search Report, International Application No. PCT/KR2006/000053; Date of mailing Apr. 14, 2006.

*Primary Examiner* — Robert Hodge
(74) *Attorney, Agent, or Firm* — Cantor Colburn LLP

(57) ABSTRACT

Disclosed is a battery casing, comprising one or more sub-layers as constitutional elements, wherein at least one region selected from the group consisting of a surface of the casing and the sub-layers of the casing is coated partially or totally with a metal having a grain size of 50 nm or less. A battery comprising the same casing is also disclosed. The casing efficiently inhibits degradation of the safety of a battery, caused by internal or external factors, and thus provides a battery with excellent safety.

19 Claims, 5 Drawing Sheets

U.S. PATENT DOCUMENTS

| | | |
|---|---|---|
| 6,261,720 B1 | 7/2001 | Kimiya et al. |
| 6,316,143 B1 | 11/2001 | Foster et al. |
| 6,617,071 B2 | 9/2003 | Chen et al. |
| 6,815,105 B2 | 11/2004 | Cooper et al. |
| 6,991,873 B2 | 1/2006 | Sakai et al. |
| 2005/0221188 A1* | 10/2005 | Takami et al. ........... 429/231.95 |

FOREIGN PATENT DOCUMENTS

| | | |
|---|---|---|
| JP | 11-135081 | 5/1999 |
| JP | 11135081 | 5/1999 |
| KR | 1020040040439 A | 5/2004 |
| WO | WO 97/44835 | 11/1997 |
| WO | 01/57941 A1 | 8/2001 |

* cited by examiner

CASE FOR BATTERIES AND PREPARATION METHOD THEREOF

TECHNICAL FIELD

The present invention relates to a battery casing, which has high strength so as to efficiently inhibit a volumetric change due to the expansion of an electrode and an increase in internal pressure of an electrode, and shows improved impact resistance, scratch resistance and perforation resistance. The present invention also relates to a battery comprising the same battery casing.

BACKGROUND ART

Recently, as portable electronic instruments are required to have multifunctionality and long service time, it is necessary for lithium secondary batteries used as power sources for such portable electronic instruments to be provided with high capacity.

A battery, for example, a secondary battery uses a metallic can as a battery casing. A part of primary batteries, including lithium batteries, and lithium polymer secondary batteries use a multilayer pouch, which comprises aluminum foil and various types of polymer films, as a battery casing.

In order to impart high capacity to a lithium secondary battery, it is possible to use an anode material and a cathode material having high capacity. In addition, thinning of a battery casing may be useful for providing a battery with high capacity. This is due to reduction in the thickness of a battery casing, such as a can, which enables a surplus amount of electrode active materials to be applied to a battery. Therefore, it is possible to provide a battery with high capacity and high-rate charge/discharge characteristics. However, a can shows poor strength when it is made thinner. Therefore, when the internal pressure of a battery increases due to the gas generated during charge/discharge cycles, or when a jelly roll-like structure expands due to repeated charge/discharge cycles, the can may be swelled, thereby adversely affecting the quality of a battery. Additionally, there is a possibility of a battery pack itself or electric and electronic instruments using the battery pack being damaged during repeated charge/discharge cycles after the assemblage of a battery.

Meanwhile, when a multilayer pouch is used as a battery casing, there is an advantage in that a battery using the multilayer pouch has a significantly decreased weight compared to the corresponding battery using the aforementioned metallic can.

As shown in FIGS. 2 and 3, a lithium ion polymer battery 1, also referred to as a "pouch battery", comprises: a casing main body 2 having an inner space 2a with a predetermined size; a cover 3 coupled rotatably to the casing main body 2; a predetermined number of unit cells 4, which comprises a cathode 4a, an anode 4b and a separator 4c and is inserted into the inner space 2a of the casing main body 2; connections 5 extending longitudinally and externally from each end of the cathode 4a and the anode 4b in each unit cell; and a cathode terminal 6 and an anode terminal 7, each connected to the corresponding connection.

Herein, an extended portion 2b with a predetermined width is formed at the top edge of the inner space 2a of the casing main body 2, toward the exterior on the horizontal surface, for the purpose of heat fusion. Also, an insulation tape 8 formed of a non-conductive material is coated on the central portion of each of the cathode terminal 6 and the anode terminal 7, connected to the corresponding connection 5. The insulation tape 8 is provided in order to prevent a short circuit between a heat fusion device and an electrode terminal 6 or 7 when the heat fusion device (not shown) performs heat fusion between the extended portion 2b of the casing main body 2 and the edge portion 3a of the cover 3, and to increase sealability between the sealed portions 2b and 3a.

Then, a predetermined number of unit cells 4, each unit cell comprising the cathode 4a, the anode 4b and the separator 4c, is inserted into the inner space 2a of the casing main body 2. Next, a predetermined amount of electrolyte is injected into the inner space, and then the cover 3 is adhered closely to the casing main body 2, so that the extended portion 2b of the casing main body can be sealed with the edge portion 3a of the cover 3 by using a heat fusion device (not shown) to prevent the electrolyte from leaking.

More particularly, the connection 5 of each unit cell 4 is connected to the corresponding electrode terminal 6 or 7, whose central portion is coated with an insulation tape 8. Additionally, each electrode terminal and a part of the insulation tape 8 protrude out from the casing main body 2 and the cover 3.

For example, each of the casing main body 2 and the cover 3 is comprised of an outer coating layer 9a formed of an oriented nylon film (Ony), a barrier layer 9b formed of Al, and an inner sealant layer 9c formed of a casting polypropylene film (CPP). Additionally, a hot melt layer (not shown) is coated on the edges of the inner sealant layer, so that the extended portion 2b of the casing main body 2 and the edge portion 3a of the cover 3 can be in close contact with each other and fixed to each other by heat and pressure provided by a heat fusion device.

However, in the aforementioned pouch battery according to the prior art, both the casing main body and the cover are comprised of an outer coating layer formed of an oriented nylon film (Ony), a barrier layer formed of Al, and an inner sealant layer formed of a casting polypropylene film (CPP). Hence, when the battery is subjected to a physical impact or is compressed by a sharp object, the casing main body and the cover of the pouch battery is damaged with ease, resulting in safety-related problems, such as infiltration, ignition or explosion. Additionally, there is another problem of poor processability during the assemblage of a battery, caused by the softness of the pouch.

BRIEF DESCRIPTION OF THE DRAWINGS

The foregoing and other objects, features and advantages of the present invention will become more apparent from the following detailed description when taken in conjunction with the accompanying drawings in which.

DISCLOSURE OF THE INVENTION

Figure 1:
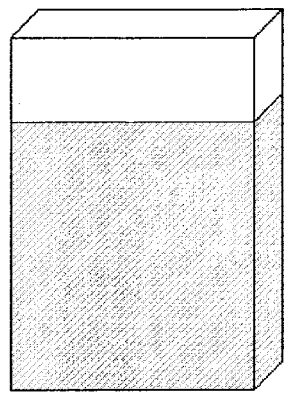
FIG. 1 is a schematic view showing the can according to Example 1, as a test sample.
Figure 2:
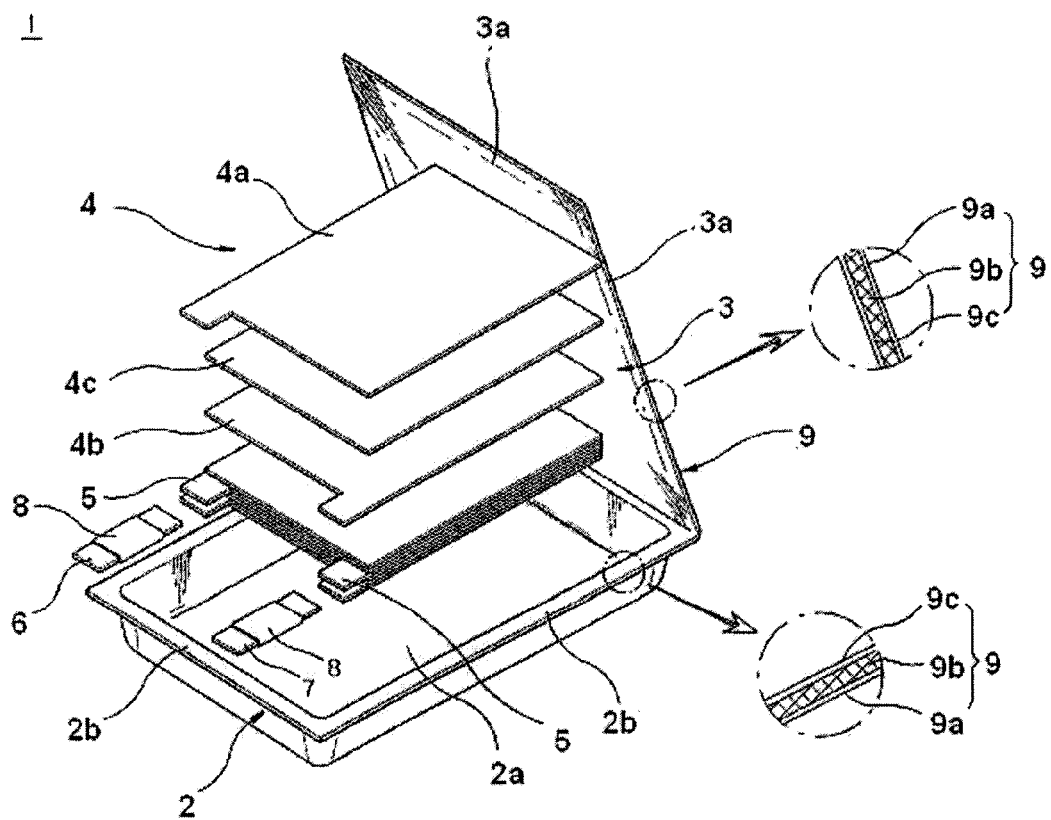
FIG. 2 is an exploded perspective view showing a conventional pouch type lithium polymer battery.
Figure 3:
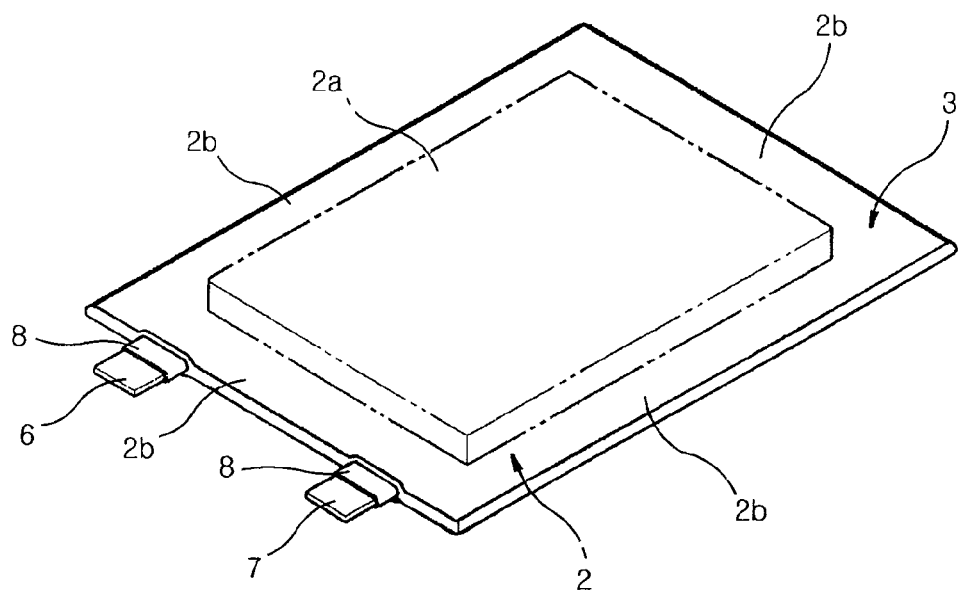
FIG. 3 is a schematic perspective view showing a conventional pouch type lithium polymer battery.

Therefore, the present invention has been made in view of the above-mentioned problems. The present inventors have found that when a battery casing, for example a can type battery casing, is coated uniformly with a metal having a nano-scaled grain size partially or totally on the surface thereof to form a nano-crystalline metal film, the battery casing can show a high strength sufficient to efficiently inhibit a volumetric change of a battery, caused by an increase of gas pressure due to repeated charge/discharge cycles, and by expansion of a jelly-roll like structure, and can be thinned to provide a battery with high capacity.

Additionally, we have found that, in addition to the aforementioned can type battery casing, when one of the constitutional elements of a pouch type battery casing, such as a barrier layer, is coated partially or totally with the same metal having a nano-scaled grain size as described above to form a uniform nano-crystalline metal film, it is possible to inhibit degradation in the safety of a battery, caused by physical impacts applied to a battery or compression of a battery by a sharp object, and to solve the aforementioned problem of poor processability during the assemblage of a battery, caused by the softness of a conventional pouch.

Therefore, it is an object of the present invention to provide a high-strength battery casing. It is another object of the present invention to provide a method for manufacturing the same. It is still another object of the present invention to provide a battery comprising the same.

According to an aspect of the present invention, there is provided a battery casing comprising one or more sub-layers as constitutional elements, wherein at least one region selected from the group consisting of a surface of the battery casing and the sub-layers is coated partially or totally with a metal having a grain size of 50 nm or less. According to another aspect of the present invention, there is provided a battery, preferably a secondary battery, comprising the above-battery casing.

According to still another aspect of the present invention, there is provided a method for manufacturing a battery casing, coated with a metal having a grain size of 50 nm or less, which comprises the steps of: (a) dissolving a nickel precursor compound or a nickel-containing alloy precursor compound into a solvent; (b) dipping a battery casing or metal foil forming the casing into the solution obtained from step (a) so that the casing is coated with the solution; and (c) drying the coated casing or metal foil.

Hereinafter, the present invention will be explained in more detail.

The battery casing according to the present invention is characterized by comprising a uniform coating layer formed partially or totally on the surface of the can, or partially or totally on a constitutional element of a multilayer type pouch, wherein the coating layer is formed of a metal with a nano-scaled grain size.

Such nano-crystalline metal film formed on the surface and/or inside of a casing can provide the following effects:

1) In general, a conventional lithium secondary battery using a prismatic can is manufactured by introducing a jelly roll-like structure obtained by winding a band-shaped anode, a band-shaped cathode and a separator interposed between both electrodes, and an electrolyte, into a container (can) further including terminals therein. Herein, when a can comprising a thin metal plate made of stainless steel, nickel-plated steel, aluminum or aluminum alloys is used in the aforementioned conventional battery, internal pressure of the battery may increase due to the gas generated during charge/discharge cycles, or the jelly roll-like structure expands due to repeated charge/discharge cycles, thereby causing degradation in the capacity, cycle characteristics and safety of the battery. To solve the problems, a method for increasing the thickness of a casing, such as a can, has been proposed. However, even if the thickness is increased artificially, the battery using the casing cannot satisfy the condition of high capacity. Additionally, when a can is made of a stronger material (for example, iron or iron alloys), the can may have increased strength. However, in this case, there are problems in that energy density per unit weight decreases due to the increased weight, and a conventional process for assembling a battery should be modified significantly. In fact, materials with high strength, such as iron and iron alloys, have already been used in a cylindrical can among various types of casings. Therefore, there is an imminent need for a novel method other than the above method of using a high-strength material.

On the contrary, in the battery casing according to the present invention, the nano-crystalline metal film comprising a metal with a nano-scaled grain size is formed partially or totally on the surface of the battery casing. Hence, it is possible to prevent degradation in the quality of a battery as well as a battery pack by virtue of the high strength characteristics imparted to the casing.

2) Additionally, according to the present invention, the same nano-crystalline metal film formed by coating a metal having a nano-scaled grain size as described above is formed partially or totally on other battery casings than the aforementioned cans, for example, on a constitutional element forming a multilayer type pouch. Also, in this case, it is possible to improve the impact resistance, scratch resistance and perforation resistance of the casing, so as to improve the safety of a battery.

3) Further, according to the present invention, it is possible to obtain a thinner casing while satisfying the requirement of high strength. Therefore, it is possible to provide a battery with high capacity.

The metal, which is coated partially or totally on at least one region selected from the group consisting of the surface of a battery casing and a constitutional element forming the casing according to the present invention, takes the form of a metal film by the aggregation of single crystals having different orientations, i.e. grains.

Herein, the metal preferably has a grain size of 50 nm (0.05 μm) or less. More preferably, the metal is coated uniformly on the region to be coated with a size of 20 nm or less. The grain size of a metal can be obtained by a method generally known to one skilled in the art. For example, a curve width is measured on an X-ray diffraction chart, and then the measured width is introduced into the Sherr's equation. If the metal grain size is greater than 50 nm, it is not possible to obtain high strength to a desired degree.

Although there is no particular limitation in the metal component of the metal grains, nickel or nickel-containing alloy is preferred. Also, there is no particular limitation in the component present in the nickel-containing metal alloy, as long as it can form alloy with nickel. Particular non-limiting examples of the component include transition metals, such as Fe, Mn, In, Ag, Ge, Co or combinations thereof.

Preferably, the nano-crystalline metal film formed by coating the metal having a nano-scaled size has a thickness of 0.05~100 µm, more preferably of 0.05~50 µm. However, the scope of the present invention is not limited thereto. If the thickness is less than 0.05 µm, it is not possible to obtain sufficient strength of the casing, resulting in degradation in the safety of a battery. On the other hand, if the thickness is greater than 100 µm, the casing is too thick to satisfy the requirement of high capacity of a battery.

Figure 6:
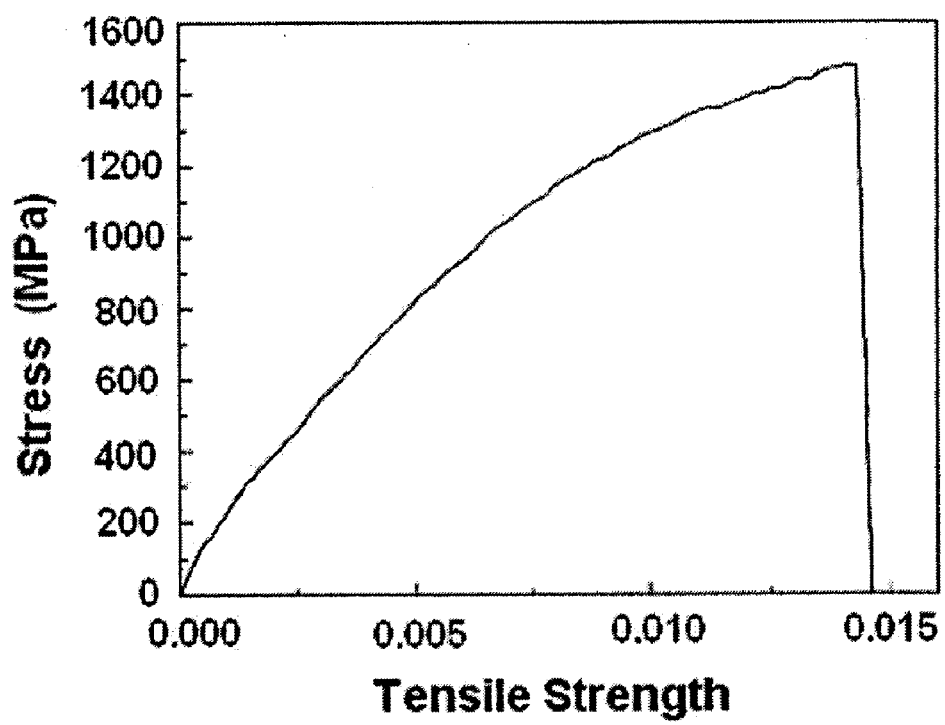
FIG. 6 is a graph showing the tensile strength of the can according to Example 1.

The battery casing according to the present invention, comprising a crystalline metal film with a thickness of 0.05~100 µm, which is formed by coating a metal having a grain size of 50 nm or less, can show a high strength of 800 MPa or more, preferably of 1 GPa or more (see FIG. 6). This can be demonstrated by the results of the following Experimental Example (see FIG. 6), as well as by the following Hall-Petch's equation:

[Hall-Petch's Equation]

$$A_L = A_0 + K_L d^{-1/2}$$

Wherein $A_L$ is strength, $A_0$ is strength in grains, d is a particle size, and $K_L$ is a constant depending on temperature.

In other words, metal grains, i.e. single crystals having different orientations, form a polycrystalline metal. In general, hardness of such polycrystalline metal is in inverse proportion to the grain size (d). Therefore, it can be estimated that the battery casing according to the present invention, which comprises nano-sized metal grains, can show high strength.

In fact, aluminum or aluminum alloy used in a conventional battery casing, such as a prismatic can, has a hardness of about 190 Mpa, and nickel metal has a tensile strength of about 490 Mpa. However, the battery casing coated with a metal having a nano-scaled grain size according to the present invention shows a significantly high strength of about 1400 Mpa. This is demonstrated by the following Experimental Example (see FIG. 6).

Figure 9:
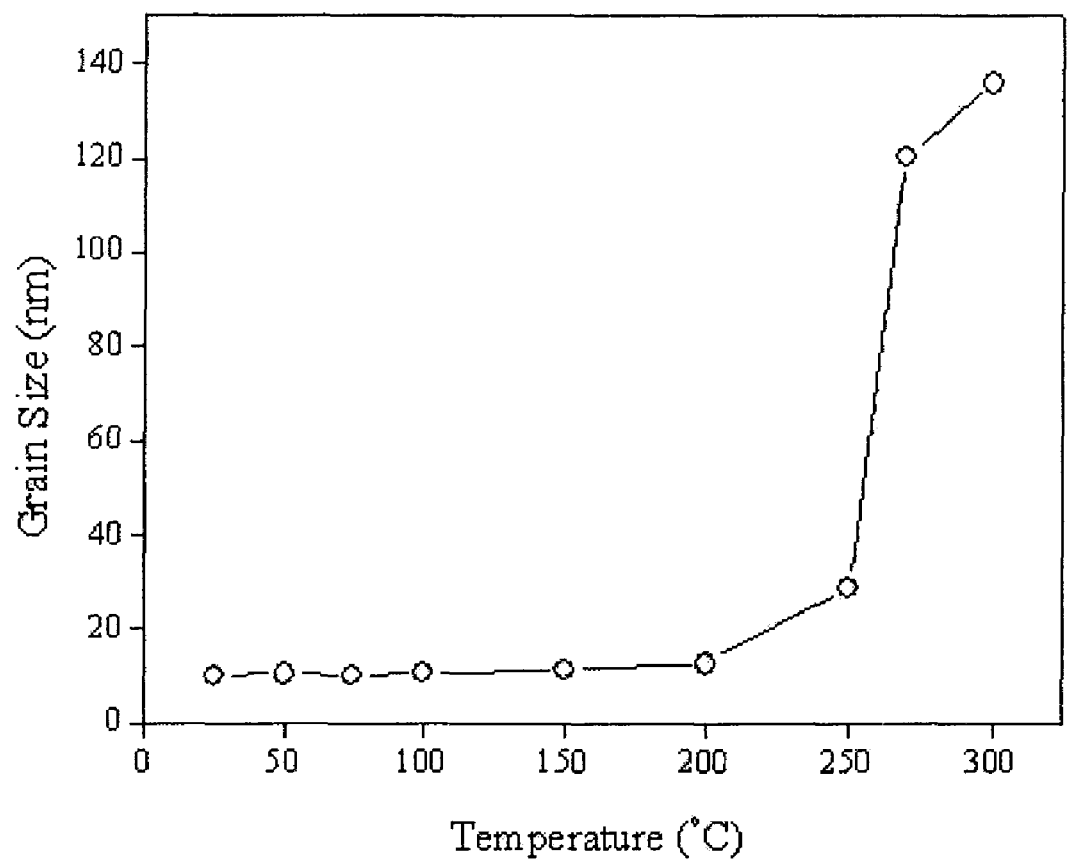
FIG. 9 is a graph showing variations in the metal grain size depending on heat treatment temperature.

Additionally, the nano-crystalline metal film formed by coating the metal grains is preferably heat treated at a temperature of 270° C. or less. This is because the adhesion between the casing and the nano-crystalline metal film can be improved. If the heat treatment temperature is higher than 270° C., grains of the metal film grow excessively, as shown in FIG. 9. Thus, it is not possible to obtain sufficient strength of the casing.

The nano-crystalline metal film can be formed before or after forming a secondary battery, and thus can facilitate a process for manufacturing a secondary battery.

There is no particular limitation in materials, shapes, etc. of the battery casing, on which a metal film having a nano-scaled grain size is coated according to the present invention, as long as the casing allows the formation of the metal film. Non-limiting examples of the casing include a can, a pouch, or the like.

The can may be formed of a currently used metal or alloy, and particular examples thereof include iron, nickel, aluminum or alloys thereof. Also, there is no particular limitation in the size and shape of the metal or alloy.

Additionally, the pouch may be formed of any materials currently used in the art, and may have a conventional size and shape. For example, in the case of a pouch having a multilayer structure, the pouch successively comprises: (a) a polyolefin-based inner sealant layer as a heat fusinoable material; (b) a barrier layer comprising metal foil, preferably aluminum foil; and (c) an outer coating layer comprising a polymer film.

Hereinafter, a pouch type casing having a multilayer structure will be explained in more detail.

The inner sealant layer (a) is comprised of a polyolefin-based polymer, and serves to electrically shield the bottom portion of a unit cell by virtue of the heat fusion and insulation properties of the polymer. Non-limiting examples of the polyolefin-based polymer include polypropylene, chlorinated polypropylene, polyethylene, ethylene-propylene copolymer, polyethylene-acrylic acid copolymer, polypropylene-acrylic acid copolymer, and mixtures thereof. Particularly, casting polypropylene film (CPP) is preferred. The inner sealant layer preferably has a thickness of 30~150 µm, but is not limited thereto.

The barrier layer (b) interposed between the inner sealant layer and the outer coating layer is comprised of metal foil, and serves as a substrate, which prevents infiltration of moisture or air into the unit cell and maintains the strength of the multilayer structure. Therefore, in order to provide high strength by using the nano-sized metal grains, it is preferable to form the nano-crystalline metal film partially or totally on the metal foil surface of the barrier layer. Non-limiting examples of the material that forms the metal foil include aluminum, nickel or alloys thereof. Particularly, aluminum or aluminum alloys (No. 8079, 1N30, 8021, 3004) is preferred. The metal foil preferably has a thickness of 20~150 µm, but is not limited thereto.

The outer coating layer (c) has desired hardness, softness and insulation property to protect the layers present inside thereof. Non-limiting examples of the polymer that may be used in the outer coating layer include nylon currently used in the art, preferably ONy (oriented nylon film). The outer coating layer preferably has a thickness of 15~25 µm, but is not limited thereto.

The high-strength battery casing according to the present invention may be manufactured by forming a metal film having a nano-scaled grain size partially or totally on the surface of the casing and/or on a constitutional element forming the casing by way of a conventional coating process.

Non-limiting examples of the coating process include a solvent evaporation process, a co-precipitation process, a precipitation process, a sol-gel process, an adsorption & filtering process, an electroplating process, and an electroless plating process. Particularly, an electroplating process is preferred.

One embodiment of the method for manufacturing the battery casing according to the present invention will be explained hereinafter.

1) First, a nickel precursor compound or a nickel-containing alloy precursor compound is dissolved into a solvent to form an electrolyte (electrolyte for plating).

As the nickel precursor compound or the nickel-containing alloy precursor compound, a water soluble or insoluble compound, including the aforementioned metal or a combination of one or more metals, may be used. Non-limiting examples of the precursor compound include an alkoxide, nitrate, acetate, halide, hydroxide, oxide, carbonate, oxalate, sulfate, or the like, which comprises the aforementioned metal or metal combination. Such precursor compounds may be used in combination. Particularly, nickel chloride, nickel sulfate or a mixture thereof is preferred.

Preferably, the solvent is distilled water. The electrolyte (electrolyte for plating) preferably has a pH of 2~5, but is not limited thereto.

Other additives, which improve strength and conductivity, may be further added to the electrolyte. Such additives serve to provide a desired particle size and homogeneity. Particular examples of such additives include saccharin, coumarin, thiourea or a mixture thereof. Preferably, such additives are used after the iron and/or nickel precursor compound is sufficiently dissolved by the heat application to the electrolyte, so as to ensure the homogeneity of the electrolyte.

2) Next, the electrolyte obtained as described above is used to perform the plating of a battery casing and/or metal foil of a constitutional element (e.g. barrier layer) of the casing.

In one embodiment of such plating, a battery casing to be plated (e.g. a can or metal foil of a barrier layer) is used as a negative electrode, while a nickel plate or a non-soluble plate is used as a positive electrode. Then, both electrodes are faced to each other while being spaced apart from each other. The assembly is dipped into the electrolyte for plating, and direct current is applied thereto to precipitate nano-sized nickel or nickel-containing alloy grains on the surface of the can by way of electrolysis.

Preferably, the electrolyte (electrolyte for plating) has a temperature of 30~70° C. If the temperature is less than 30° C., movement of nickel or nickel-containing alloy ions decreases, resulting in the formation of a polarized layer on the electrode surface, and a drop in metal deposition rate. If the temperature is higher than 70° C., evaporation of the electrolyte increases, the electrolyte becomes have an unstable concentration, and a great amount of fumes are generated.

It is preferable that both electrodes are spaced apart from each other by a distance of 5~60 mm, and the flow rate of a pump for agitating the electrolyte is 20~120 cm/sec. Current density is preferably 5~50 A/cm$^2$. Deposition rate of the nano-sized nickel or nickel-containing alloy grains, which are coated on the surface of the casing, is preferably between 1 µm/min and 10 µm/min, but is not limited thereto. The time, current density and other parameters needed for carrying out the electroplating process depend on the thickness of a desired coating layer.

Preferably, a conventional pretreatment step is carried out in order to remove the contaminants and oxidized coating layer on the surface of the casing (e.g. can and/or metal foil) as well as to facilitate electroplating on the surface.

After the plating step as described above, reduced nickel or nickel-containing alloy having a grain size of 50 nm or less is precipitated on the surface of the casing (i.e. negative electrode). After a predetermined amount of time, a uniform nano-crystalline metal film having a thickness of 0.1~70 µm is formed partially or totally on the surface of the battery casing (e.g. can and/or metal foil).

After coating the metal film, a conventional drying step is performed to complete manufacture of the casing. An additional heat treatment step maybe performed at a temperature of 270° C. or less. If such heat treatment is performed, it is possible to improve the adhesion between the casing and the metal film.

If the product obtained from the aforementioned process is a can, it may be used as it is. On the other hand, if the product is metal foil, it is necessary to further carry out an adhesion step for an outer coating layer comprising a polymer film, a barrier comprising the metal foil and an inner sealant layer.

To perform the adhesion step, conventional methods known to one skilled in the art, including dry lamination, heat lamination or extrusion lamination, may be used. In one embodiment of the adhesion step, an adhesive is interposed between one layer and another layer and then dried. Next, both layers are adhered to each other by using a heating roll at a temperature higher than room temperature under pressure. In another embodiment of the adhesion step, an adhesive is interposed between one layer and another layer. Next, both layers are adhered to each other by using a pressing roll at room temperature under a predetermined pressure. Herein, there is no particular limitation in the range of heating temperature and pressure, and a currently used range may be applied.

It is preferable that the interface between one layer and another layer is adhered by using a strong adhesive with an improved adhesion strength and tensile strength, so as to prevent interlayer separation or detachment over time, and to prevent a pouch from being damaged by external impacts, for example impacts caused upon dropping. Particularly, an adhesive comprising a urethane resin is preferred.

Also, the present invention provides a battery (preferably, a secondary battery), which comprises: (a) a unit cell obtained by assembling a cathode, an anode, and a separator interposed between both electrodes; (b) an electrolyte; and (c) a casing for housing the unit cell and the electrolyte.

The secondary battery that may be applied in the present invention includes a lithium secondary battery, and non-limiting examples of the lithium secondary battery include a lithium metal secondary battery, a lithium ion secondary battery, a lithium polymer secondary battery, a lithium ion polymer secondary battery, or the like. If the casing is a pouch type casing, a battery using a polymer electrolyte is preferred. On the other hand, if the casing is a can, a lithium ion secondary battery using a liquid electrolyte is preferred.

A conventional can type casing is made of a thin metal plate, and thus cannot have resistance against the longitudinal force caused by the swelling of a battery using the can, resulting in surface deformation of the can. On the contrary, the can type casing coated with a metal film having a grain size of 50 nm or less according to the present invention shows a high strength of 800 MPa or more. Therefore, the can according to the present invention is sufficiently resistant to the longitudinal force caused by the swelling of the battery, and thus experiences no deformation. Additionally, the can according to the present invention decreases the production of defected batteries, caused by the swelling of batteries to a thickness of higher than the standard thickness, and thus can improve the productivity and yield of batteries. Further, the can according to the present invention reduces deformation of a jelly roll-like structure of a lithium secondary battery, caused by repeated charge/discharge cycles, and thus allows the lithium ions to react in the jelly roll-like structure in a uniform and stable manner, resulting in improvements in the cycle life characteristics of the battery.

As generally known to one skilled in the art, a secondary battery is manufactured by inserting a porous separator between a cathode and an anode, assembling a unit cell, introducing the unit cell into a casing, and injecting an electrolyte. Herein, if the casing is a can, the unit cell is wound to form a jelly roll-like structure, and then is introduced into the can. If the casing is a pouch, the unit cell may be formed by a lamination or stacking process. However, the scope of the present invention is not limited thereto.

The electrode that may be used in the secondary battery according to the present invention may be formed by applying an electrode active material on a current collector according to a method known to one skilled in the art. For example, each of the cathode active material and the anode active material is mixed with a binder to form electrode slurry, which, in turn, is applied onto a current collector. Then, the solvent or dispersion medium is removed by drying, or the like, so that the active material is bonded to the collector and bonded among the active material particles.

Particularly, cathode active materials may be any conventional cathode active materials capable of lithium intercalation/deintercalation. Particular non-limiting examples of the cathode active material include lithium intercalation materials such as lithium manganese oxides, lithium cobalt oxides, lithium nickel oxides, lithium iron oxides or composite oxides thereof.

Additionally, anode active materials may be any conventional anode active materials capable of lithium ion intercalation/deintercalation. Particular non-limiting examples of the anode active material include lithium intercalation materials such as lithium metal, lithium alloys, carbon, petroleum coke, activated carbon, graphite, or other metal oxides (such as $TiO_2$, $SnO_2$ or $Li_4Ti_5O_{12}$) or other metals (such as Sn, Si, Al or Pb) capable of repeating lithium intercalation/deintercalation.

Non-limiting examples of the cathode current collector include foil formed of aluminum, nickel or a combination thereof. Non-limiting examples of the anode current collector include foil formed of copper, gold, nickel, copper alloys or a combination thereof.

The electrolyte that may be used in the present invention includes a salt represented by the formula of $A^+B^-$, wherein $A^+$ represents an alkali metal cation selected from the group consisting of $Li^+$, $Na^+$, $K^+$ and combinations thereof, and $B^-$ represents an anion selected from the group consisting of $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ and combinations thereof, the salt being dissolved or dissociated in an organic solvent selected from the group consisting of propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethylmethyl carbonate (EMC), gamma-butyrolactone (GBL) and mixtures thereof.

BEST MODE FOR CARRYING OUT THE INVENTION

Reference will now be made in detail to the preferred embodiments of the present invention. It is to be understood that the following examples are illustrative only and the present invention is not limited thereto.

EXAMPLES 1~2

Example 1

High-strength can and Lithium Secondary Battery Comprising the Same 1-1. Manufacture of Prismatic can for Test First, 50 g of nickel chloride and 50 g of nickel sulfate were dissolved into 1 L of distilled water to provide a liquid electrolyte, to which saccharin was added in an amount of 1 g/L. Next, a prismatic can, made of an aluminum alloy plate and having a width of 34 mm, a height of 50 mm and a thickness of 5.2 mm, was dipped into the electrolyte containing ionized nickel, as a negative electrode, to perform plating. By doing so, a nickel plating layer having a grain size of 25 nm was formed on the surface of the can (see FIG. 9). To perform the plating, electric current was supplied with a current density of 10 A/cm$^2$, a pump for agitating the liquid electrolyte was operated at a flow rate of 60 cm/sec, and the electrolyte was set at pH 4 and under a temperature of 45° C.

Then, the prismatic can was covered with a lid, and the edge of the can was sealed with the sealing portion of the lid by using a laser to provide a prismatic can for test (see FIG. 1).

1-2. Manufacture of Lithium Secondary Battery

An olefin-based separator was interposed between a band-shaped cathode comprising $LiCoO_2$ as a cathode active material and a band-shaped anode comprising graphite as an anode active material. Next, the resultant assembly was wound to form a jelly roll-like structure, which, in turn, was mounted to the prismatic can obtained from Example 1-1. Then, an electrolyte based on ethylene carbonate/ethyl methyl carbonate (EC/EMC=1:1) containing 1M $LiPF_6$ dissolved therein was injected into the prismatic can. The can was covered with a lid, and the edge of the can was sealed with the sealing portion of the lid by using a laser to provide a prismatic lithium secondary battery.

Example 2

Figure 4:
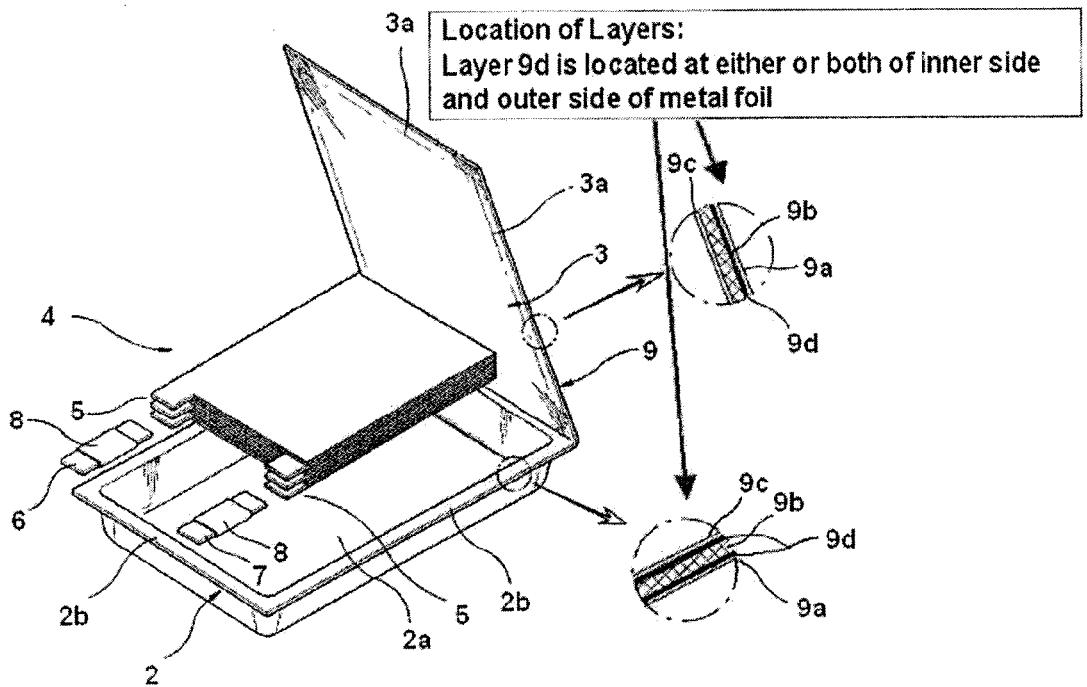
FIG. 4 is a schematic partial perspective view showing a secondary battery using the pouch type high-strength casing according to the present invention.

High-strength Pouch and Lithium Secondary Battery Comprising the Same 2-1. Manufacture of High-strength Pouch Example 1-1 was repeated to form a nickel plating layer, having a grain size of 20 nm, on the surface of aluminum foil, except that aluminum foil was used instead of the prismatic can. The resultant aluminum foil was interposed between Ony25 used as an outer coating layer and CPP used as an inner sealant layer, and adhered to the layers. The resultant pouch was subjected to heat fusion to provide a pouch for test (see FIG. 4).

2-2. Manufacture of Lithium Secondary Battery

To form a unit cell, a cathode, a separator and an anode was subjected to a lamination process instead of a winding process to form a jelly roll structure. The unit cell was introduced into the pouch obtained from Example 2-1, and the pouch, except an opening for electrode terminals, was heat fused at 130° C. Next, an electrolyte based on ethylene carbonate/ethyl methyl carbonate (EC/EMC=1:1) containing 1M $LiPF_6$ dissolved therein was injected into the pouch through the opening, and then the opening was also heat fused to provide a pouch type lithium secondary battery.

Comparative Examples 1~2

Comparative Example 1

Example 1 was repeated to provide a prismatic can for test and a lithium secondary battery comprising the can, except that the plating step according to Example 1-1 was not performed.

Comparative Example 2

Example 2 was repeated to provide a pouch and a lithium secondary battery comprising the pouch, except that non-plated aluminum foil was used as a barrier layer instead of the aluminum foil plated with nickel according to Example 2-1.

Experimental Example 1

Surface Analysis for Test Cans

The following experiment was performed to analyze the surface of the battery casing according to the present invention.

1-1. Transmission Electron Microscope (TEM)

Figure 5:
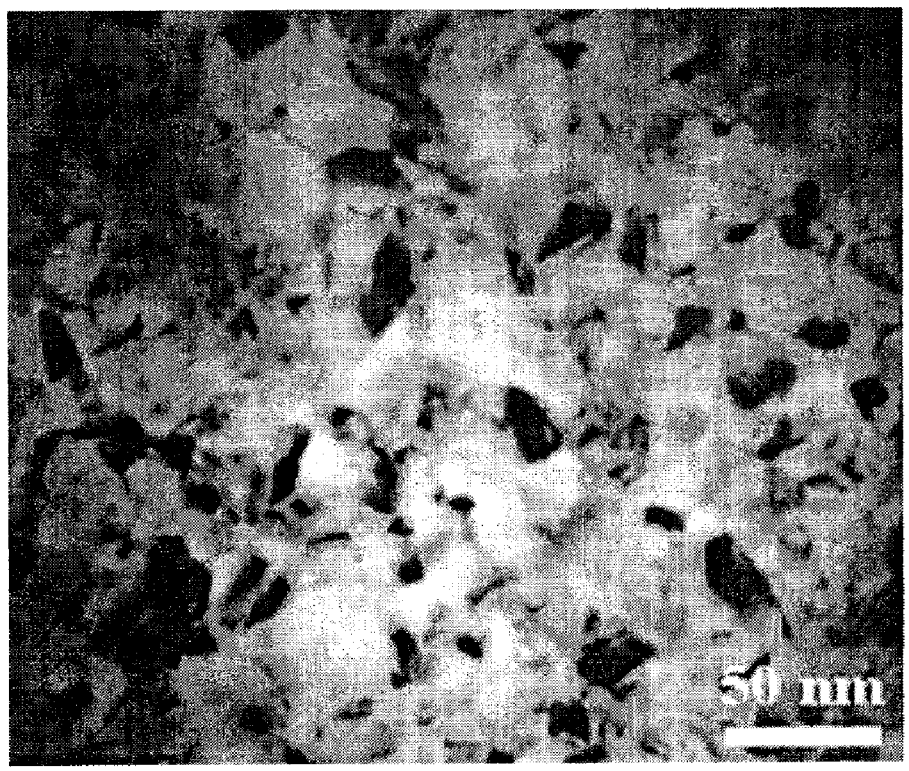
FIG. 5 is a photograph taken by Transmission Electron Microscope (TEM), which shows the results for the surface analysis of the can coated with nano-sized nickel grains according to Example 1.

The can for batteries according to Example 1 was analyzed by using a TEM. After the analysis, it could be seen that the can according to the present invention is coated uniformly with nickel having a grain size of 50 nm or less (see FIG. 5).

1-2. Evaluation for Mechanical Properties

The can for batteries according to Example 1 was subjected to a test for measuring tensile strength.

After the measurement, the battery casing comprising a nickel film having a grain size of 50 nm or less according to the present invention showed a tensile strength of about 1400 Mpa (see FIG. 6). This indicates that the casing according to the present invention has excellent strength.

Experimental Example 2

Test for Measuring Variations in Thickness of Test can

The following experiment was performed to determine variations in the thickness of the battery casing according to the present invention depending on internal pressure.

The prismatic battery comprising a prismatic can having a nickel film according to Example 1 was used as a test sample. The prismatic battery according to Comparative Example 1 was used as a control. Pressurized air was injected into each can at a pressure of 0~0.5 kgf/cm$^2$, and then each can was measured for its thickness.

Figure 7:
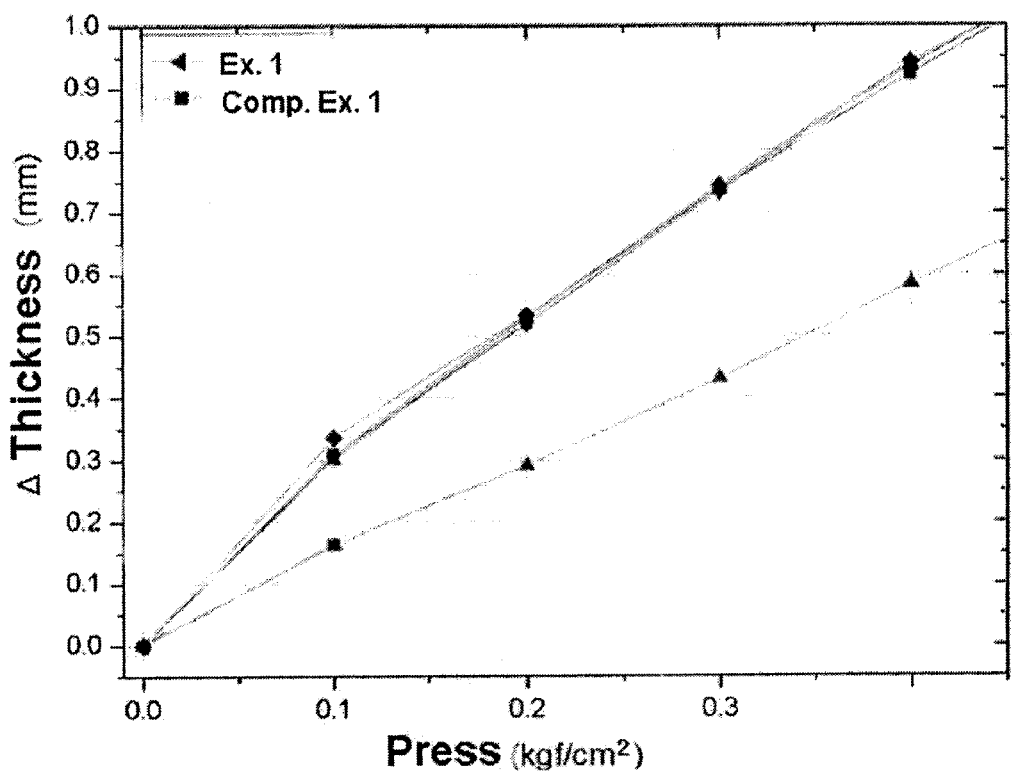
FIG. 7 is a graph showing variations in the thickness of the cans according to Example 1 and Comparative Example 1 depending on internal pressure thereof.
Figure 8:
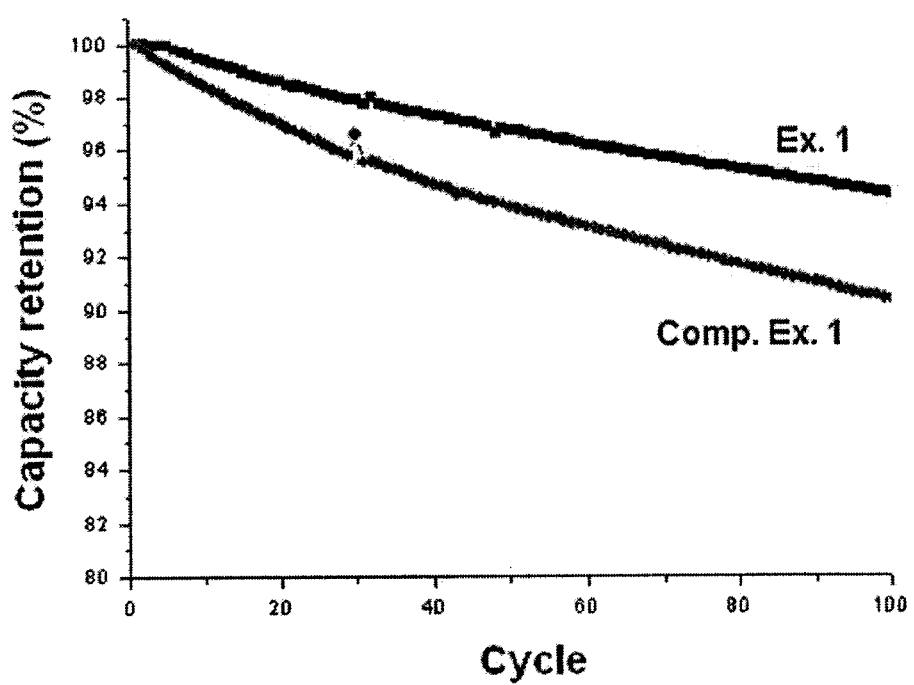
FIG. 8 is a graph showing the cycle life characteristics of the lithium secondary batteries according to Example 1 and Comparative Example 1.

After the experiment, the prismatic battery having a nanocrystalline nickel film according to Example 1 showed a significantly small variation in the thickness of the prismatic can depending on internal pressure, as compared to the conventional prismatic battery according to Comparative Example 1 (see FIG. 7). This indicates that the high-strength metal film formed partially or totally on the surface of the can inhibits expansion of electrodes and a volumetric change caused by an increase in internal pressure of electrodes.

Therefore, it can be seen from the above test results that the battery casing coated with a metal film having a grain size of 50 nm or less according to the present invention inhibits internal and external variations or damages of batteries, and thus provides batteries with excellent safety.

Experimental Example 3

Evaluation for Quality of Lithium Secondary Battery

The following experiment was performed to evaluate the cycle life characteristics of the lithium secondary battery comprising the battery casing according to the present invention.

The lithium secondary battery comprising the high-strength nickel film according to Example 1 was used as a sample. The battery comprising a conventional casing according to Comparative Example 1 was used as a control.

Each battery was charged at 1 C under a temperature of 23° C. in the range of 4.2~3V to measure the initial capacity. The charge cycle was repeated 100 times.

After the test, the lithium secondary battery comprising the battery casing having the high-strength nickel film according to Example 1 showed excellent cycle life characteristics, as compared to the battery comprising a conventional casing according to Comparative Example 1. This indicates that the high-strength casing reduces deformation of a unit cell such as a jelly roll structure, caused by repeated charge/discharge cycles, and allows lithium ions to react in the jelly roll structure in a uniform and stable manner, resulting in improvements of the cycle life characteristics of a battery.

INDUSTRIAL APPLICABILITY

As can be seen from the foregoing, the battery casing according to the present invention comprises a high-strength metal film, obtained by coating a metal with a grain size of 50 nm or less partially or totally onto the surface of a casing for housing a unit cell and/or onto a constitutional element. Therefore, the casing according to the present invention inhibits an increase in the internal pressure of a battery or swelling of a casing, so as to provide a battery and a battery pack with improved safety. Further, the casing according to the present invention can prevent deformation, damage or explosion of a battery, caused by external factors.

While this invention has been described in connection with what is presently considered to be the most practical and preferred embodiment, it is to be understood that the invention is not limited to the disclosed embodiment and the drawings. On the contrary, it is intended to cover various modifications and variations within the spirit and scope of the appended claims.

The invention claimed is:

1. A battery casing, comprising one or more sub-layers as constitutional elements, wherein at least one region selected from the group consisting of a surface of the casing and the sub-layers of the casing is coated partially or totally with a metal having a grain size of 50 nm or less.

2. The battery casing according to claim 1, which is a can-shaped or a pouch-shaped casing.

3. The battery casing according to claim 2, wherein the pouch comprises: (a) an outer coating layer; (b) a barrier layer comprising metal foil; and (c) an inner sealant layer.

4. The battery casing according to claim 3, wherein the metal foil in the barrier layer (b) is coated with the metal having a grain size of 50 nm or less.

5. The battery casing according to claim 3, wherein the metal foil in the barrier layer (b) is comprised of aluminum or aluminum alloy, and has a thickness of 20~150 μm.

6. The battery casing according to claim 1, wherein the metal having a grain size of 50 nm or less comprises nickel or nickel-containing alloy.

7. The battery casing according to claim 6, wherein the nickel-containing alloy comprises at least one metal selected from the group consisting of Fe, Mn, In, Ag, Ge and Co.

8. The battery casing according to claim 1, wherein the metal film obtained by coating the metal with a grain size of 50 nm or less has a thickness of about 0.05 to about 100 μm.

9. The battery casing according to claim 1, wherein the metal film obtained by coating the metal with a grain size of 50 nm or less has a strength of 800 Mpa or more.

10. The battery casing according to claim 1, wherein the metal film obtained by coating the metal with a grain size of 50 nm or less is formed before or after manufacturing a battery.

11. A battery comprising:
    (a) a unit cell formed by assembling a cathode, an anode and a separator interposed between both electrodes;
    (b) an electrolyte; and
    (c) a battery casing as defined in claim 1, which receives the unit cell and the electrolyte.

12. A method for manufacturing a battery casing, coated with a metal having a grain size of 50 nm or less, which comprises the steps of:
    (a) dissolving a nickel precursor compound or a nickel-containing alloy precursor compound into a solvent;
    (b) dipping a battery casing or metal foil forming the casing into the solution so that the casing is coated with the solution; and
    (c) drying the coated casing or metal foil.

13. The method according to claim 12, which further comprises a step (d) of adhering an outer coating layer comprising a polymer film, a barrier layer comprising the metal film, and an inner sealant layer, successively, in case of coating the metal foil.

14. The method according to claim 12, wherein coating step (b) is performed via plating by positioning a positive electrode and a negative electrode with an interval between both electrodes, and dipping the both electrodes into the solution, followed by application of electric current.

15. The method according to claim 14, wherein the negative electrode is the casing or the metal foil forming the casing, and the positive electrode is a nickel plate or a non-soluble substrate.

16. The method according to claim 12, wherein the solution used in step (b) further comprises at least one additive selected from the group consisting of coumarin, thiourea, saccharin and boric acid.

17. The method according to claim 14, wherein the electric current applied ranges from 5 $A/cm^2$ to 50 $A/cm^2$.

18. The method according to claim 14, wherein the metal grains coated onto the negative electrode upon plating has a deposition rate of about 1 to about 10 μm/min.

19. The method according to claim 12, which further comprises a step of heat treating the casing at a temperature of 270° C. or less.

* * * * *